United States Patent
Jeong

(10) Patent No.: US 9,584,390 B1
(45) Date of Patent: Feb. 28, 2017

(54) METHOD AND APPLICATION PERFORMANCE MONITORING DEVICE FOR MONITORING TRANSACTIONS BY ANALYZING PACKETS IN PACKET PROCESSING SYSTEM

(71) Applicant: TMAXSOFT. CO., LTD., Gyeonggi-do (KR)

(72) Inventor: Junsoo Jeong, Gyeonggi-do (KR)

(73) Assignee: TMAXSOFT.CO., LTD., Gyeonggi-do (KR)

( * ) Notice: Subject to any disclaimer, the term of this patent is extended or adjusted under 35 U.S.C. 154(b) by 0 days.

(21) Appl. No.: 15/140,740

(22) Filed: Apr. 28, 2016

(30) Foreign Application Priority Data

Feb. 29, 2016 (KR) .......................... 10-2016-0024683

(51) Int. Cl.
| | |
|---|---|
| *G06F 15/173* | (2006.01) |
| *H04L 12/26* | (2006.01) |
| *H04L 29/06* | (2006.01) |
| *H04L 12/851* | (2013.01) |

(52) U.S. Cl.
CPC ...... *H04L 43/0876* (2013.01); *H04L 47/2441* (2013.01); *H04L 69/22* (2013.01)

(58) Field of Classification Search
CPC .. H04L 43/0876; H04L 47/2441; H04L 69/22
USPC ......................................... 709/224
See application file for complete search history.

(56) References Cited

U.S. PATENT DOCUMENTS

| | | | | |
|---|---|---|---|---|
| 9,203,711 | B2 * | 12/2015 | Agarwal | H04L 43/04 |
| 9,401,853 | B2 * | 7/2016 | Agarwal | H04L 43/024 |
| 2004/0068560 | A1 * | 4/2004 | Oulu | G06F 11/3495 |
| | | | | 709/224 |
| 2006/0010299 | A1 * | 1/2006 | Zhang | H04L 67/1097 |
| | | | | 711/162 |
| 2009/0080425 | A1 * | 3/2009 | Parker | H04L 12/4645 |
| | | | | 370/390 |
| 2012/0082162 | A1 * | 4/2012 | Li | G06F 11/2071 |
| | | | | 370/392 |
| 2014/0177428 | A1 * | 6/2014 | Sinha | H04L 41/0686 |
| | | | | 370/216 |

FOREIGN PATENT DOCUMENTS

| | | |
|---|---|---|
| KR | 1020020035840 A | 5/2002 |
| KR | 100814546 B1 | 3/2008 |
| KR | 101230500 B1 | 2/2013 |

* cited by examiner

*Primary Examiner* — Tauqir Hussain

(74) *Attorney, Agent, or Firm* — Husch Blackwell LLP

(57) ABSTRACT

A method for monitoring transactions by analyzing packets in a packet processing system is provided. The method includes steps of: (a) an application performance monitoring (APM) device classifying at least one packet, if being acquired in the packet processing system through port mirroring, based on at least either of a port number and an IP address of a client device; (b) the APM device identifying at least one pair of (i) at least one packet transmitted from at least one specific device among the client device and at least one processing device in the packet processing system and (ii) at least one packet transmitted to the specific device in response to the at least one packet transmitted from the specific device by considering at least one packet under identical classification; and (c) the APM device acquiring information on the transactions by using information on the identified pair of the packets.

12 Claims, 6 Drawing Sheets

THE ORDER OF ARRIVAL OF PACKET

METHOD AND APPLICATION PERFORMANCE MONITORING DEVICE FOR MONITORING TRANSACTIONS BY ANALYZING PACKETS IN PACKET PROCESSING SYSTEM

CROSS REFERENCE TO RELATED APPLICATION

This application claims priority to and incorporates herein by reference all disclosure in Korean Patent Application No. 10-2016-0024683 filed Feb. 29, 2016.

FIELD OF THE INVENTION

The present invention relates to a method, and an application performance monitoring (APM) device for monitoring transactions by analyzing packets in a packet processing system capable of processing packets transmitted from a client device as a device that requests transactions to start; and more particularly, to the method, and the APM device, (a) classifying or supporting to classify at least one packet, if being acquired in the packet processing system through port mirroring, based on at least either of a port number and an IP address of the client device, (b) identifying and supporting to identify at least one pair of at least one packet transmitted from at least one specific device among the client device and at least one processing device in the packet processing system and at least one packet transmitted to the specific device in response to the at least one packet transmitted from the specific device by considering at least one packet under an identical classification, and (c) acquiring information on the transactions by using information on the identified pair of the packets.

BACKGROUND OF THE INVENTION

In the past, a technology of tracing flow of packets belonging to a same transaction by analyzing the packets transmitted and received over a network according to a conventional APM technologies.

As a conventional technology, there is a method of matching a pattern based on statistical data. This is a method of predicting that an ID or a number representing a certain transaction will be inserted into a packet collected over a network and determining that the packets are belonging to an identical transaction if the packets have the same ID and the same number.

However, the conventional technology takes a long time because all the packets must be parsed and it is not accurate because it is based on the statistical method.

As a matter of fact, it is not easy for companies which suffer from high network load to identify the same transaction and monitor the performance of transactions by adopting the above-mentioned method.

Thus, the inventor came to develop a technology capable of monitoring the performance of transactions effectively by tracking the flow of packets belonging to the same transaction rapidly and accurately even under a situation of high network load.

SUMMARY OF THE INVENTION

It is an object of the present invention to solve all the aforementioned problems.

It is another object of the present invention to provide a technology capable of monitoring performance of a transaction effectively by tracking flow of packets belonging to a same transaction rapidly and accurately under a situation of high network load.

It is still another object of the present invention to provide a technology capable of identifying packets belonging to the same transaction by classifying the packets acquired through port mirroring based on at least either of a port number and an IP address of a client device.

It is still yet another object of the present invention to provide a technology capable of monitoring the performance of the transactions without the omission of any trace, i.e., any pair of one request and a response corresponding to the request in a transaction.

In accordance with one aspect of the present invention, there is provided a method for monitoring transactions by analyzing packets in a packet processing system capable of processing packets transmitted from at least one client device, including steps of: (a) an application performance monitoring (APM) device classifying or supporting to classify at least one packet, if being acquired in the packet processing system through port mirroring, based on at least either of a port number and an IP address of the client device; (b) the APM device identifying and supporting to identify at least one pair of (i) at least one packet transmitted from at least one specific device among a plurality of devices, including the client device and at least one processing device in the packet processing system and (ii) at least one packet transmitted to the specific device in response to the at least one packet transmitted from the specific device by considering at least one packet under an identical classification; and (c) the APM device acquiring information on the transactions by using information on the identified pair of the packets.

In accordance with another aspect of the present invention, there is provided an APM device for monitoring transactions by analyzing packets in a packet processing system capable of processing packets transmitted from at least one client device, including: a communication part for acquiring or supporting to acquire at least one packet from the packet processing system through port mirroring; and a processor for (i) classifying or supporting to classify the acquired at least one packet based on at least either of a port number and an IP address of the client device, (ii) identifying and supporting to identify at least one pair of (ii-1) at least one packet transmitted from at least one specific device among a plurality of devices, including the client device and at least one processing device in the packet processing system and (ii-2) at least one packet transmitted to the specific device in response to the at least one packet transmitted from the specific device by considering at least one packet under an identical classification, and (iii) acquiring information on the transactions by using information on the identified pair of the packets.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
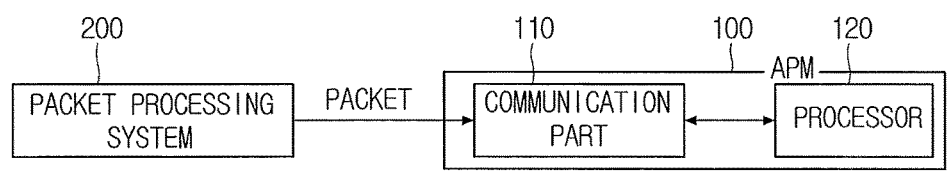
FIG. 1 is a diagram illustrating a configuration of an APM device in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

FIG. 1 is a diagram illustrating a configuration of an APM device in accordance with one example embodiment of the present invention.

An APM device 100 in accordance with one example embodiment of the present invention monitors transactions by analyzing packets in a packet processing system 200 capable of processing packets transmitted from at least one client device (not illustrated).

By referring to FIG. 1, the APM device 100 may include a communication part 110, and a processor 120.

The communication part 110 may acquire or support to acquire one or more packets from the packet processing system through port mirroring. More specifically, the communication part 110 may acquire or support to acquire one or more packets passing through one or more switches connected to the packet processing system 200 by mirroring the packets.

The processor 120 controls the operations of the APM device 100. In particular, the processor 120 may classify or support to classify the packets based on at least either of a port number and an IP address of the client device.

The operation of the processor 120 for classifying packets will be explained in more detail below by referring to FIG. 2.

Figure 2:
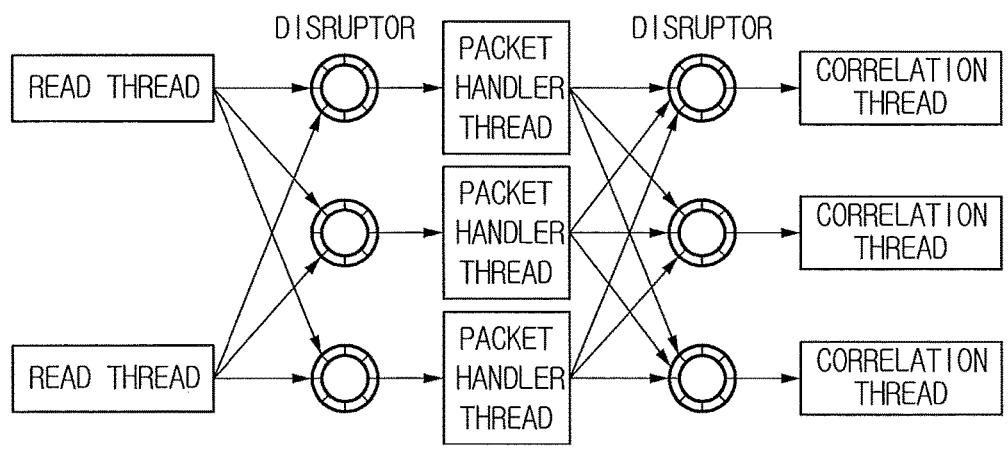
FIG. 2 is a drawing showing a configuration of delivering packets among multiple threads in accordance with the present invention.

FIG. 2 is a drawing showing a configuration of delivering packets among multiple threads in accordance with the present invention.

By referring to FIG. 2, if one or more packets are acquired through port mirroring, the processor 120, first of all, allows one or more read threads to read the packets and to distribute the packets based on information on source IP to one or more packet handler threads where the source IP represents an IP address of a first specific device when a packet is transmitted from the first specific device to a second specific device. Herein, the first specific device and the second specific device may be a client device or one of processing devices in the packet processing system 200. As such, the packets are distributed based on information on the source IP to prevent one or more traces from being omitted according to a method of classifying packets transmitted from the first specific device. The reason of distributing the packets on the basis of the source IP is to solve the problem of integrity arising from the fact that the packet handler threads have multi-thread structure. This will be explained in more detail later by referring to FIG. 3.

Next, the processor 120 may allow the packet handler threads to distribute the packets to one or more correlation threads based on the port number of the client device and then to classify the packets based on ClientInfo as information that includes the port number and the IP address of the client device.

Meanwhile, the processor 120 may allow one or more ring buffers to play a role in transmitting the packets from the read threads to the packet handler threads and then from the packet handler threads to the correlation threads. The ring buffer may be a disruptor as illustrated in FIG. 2.

The packet classification method as shown above is just one example embodiment and the packets may be classified under other methods.

In other words, the processor 120 may (i) allow the read threads to read the packets if the packets are acquired through the port mirroring; (ii) allow the read threads to distribute the packets based on information on source IP to the packet handler threads; and (iii) allow the packet handler threads to distribute the packets to the correlation threads based on at least either of a port number and an IP address of the client device.

As such, the present invention has an effect of accurately identifying the packets belonging to a same transaction by using a way of classifying the packets through port mirroring based on at least either of the port number and the IP address of the client device, gathering the packets belonging to the same transaction in the same correlation threads and inspecting whether the packets have identical clientinfo or not.

For continuous explanation on the operation of the processor 120, the processor 120 may identify or support to identify at least one pair among the packets. Herein, the pair includes (i) at least one packet transmitted from at least one specific device among a plurality of devices, including the client device and at least one processing device in the packet processing system and (ii) at least one packet transmitted to the specific device in response to the at least one packet transmitted from the specific device by considering at least one packet under an identical classification. More specifically, the processor 120 may identify or support to identify the pair of the packet transmitted from the specific device and the packet transmitted to the specific device in response to the packet transmitted from the specific device by using a source port as a port number of the specific device, a source IP as an IP address thereof, a destination IP as an IP address of a device that receives the packet transmitted therefrom, and a destination port as a port number of the device that receives the packet transmitted therefrom.

Besides, the processor 120 may acquire information on the transactions by using information on the identified pair of packets. The processor 120 may determine that all the data on the transactions are collected if the pairs of all the transactions are matched and then provide the monitoring information by using the result of determination.

The packet processing system 200 may be comprised of multiple detail devices.

Figure 3:
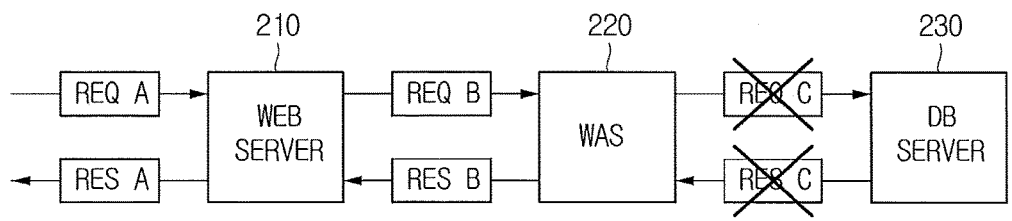
FIG. 3 is a diagram illustrating a configuration of a packet processing system in accordance with one example embodiment of the present invention.
Figure 3:
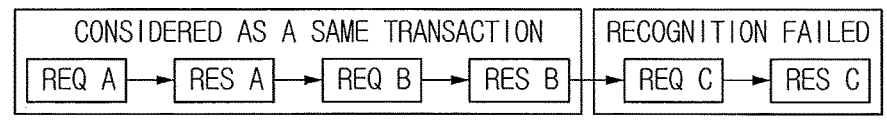

FIG. 3 is a diagram illustrating a configuration of a packet processing system in accordance with one example embodiment of the present invention.

By referring to FIG. 3, the packet processing system 200 in accordance with one example embodiment of the present invention may include a web server 210 for receiving and processing a request of the client device, a web application server (WAS) 220 for receiving and processing the request of the web server 210, and a database server 230 for receiving and processing a query request of the WAS 220 and returning a result of the query request.

If the transactions start between the web server 210 and the WAS 220, the IP address and the port number of the client device are transmitted under the names of Remote IP and Remote Port. If communications start between the WAS 220 and the database server 230, the IP address and the port number of the client device may be transmitted by using a JDBC driver BCI or a JDBC driver wrapper. The packets are transmitted among the web server 210, the WAS 220, and the database server 230. For example, the web server 210 may transmit a request B (req B) to the WAS 220 and receive a response B (res B) from the WAS 220 as shown in FIG. 3. The port mirroring is executed through the switches connected to the web server 210, the WAS 220, and the database server 230, respectively.

As illustrated in FIG. 3, if the correlation thread receives particular response packets (res B, res A) earlier than a particular request packet (req C) and if a response packet (res C) corresponding to the particular request packet arrives late, a pair of req C and res C could not be identified and the existence of the task with respect to the pair of req C and res C cannot be identified. At the time, if all of a req A, a res A, a req B, and a res B are acquired, pairs of requests and responses are considered to be matched and therefore, it may be mistakenly considered that all the data on the transactions are collected. Thus, a problem of loss of some trace information of the transactions occurs.

The problem is related even to the reason of the read threads distributing the packets to the packet handler threads based on the source IP. As the packet handler threads with a multi-thread structure perform tasks independently, the performance time by task depends on the number of tasks allocated by thread and the processing time of a task by thread. Accordingly, the problem occurs because, from the viewpoint of the correlation threads, it is not guaranteed that the packets are delivered from the packet handler threads in order of the packets read by the read threads.

To prevent the problem in the prevent invention, a method of the read threads distributing the packets to the packet handler threads based on information on source IP and a method of an ingress port mirroring are applied.

A distribution algorithm for distributing the packets based on information on the source IP is a method for allowing the correlation threads to guarantee the order of the packets read by the read threads. Failure in guaranteeing the order of the read packets occurs if the correlation threads do not identify that there are the req C and the res C on the ground that it has received the req A, the res A, the req B, and the res B before receiving the req C, and the res C. Thus, if the correlation threads receive the req C or the res C before receiving all the reqs A and B and the res A and B, the correlation threads can recognize the packets of the req C and the res C and then the problem may disappear. Accordingly, if it can be guaranteed that the correlation threads always receive the req C before the res B, and the req B before the res A, the problem could be avoided. What to pay attention to is that the req C and the res B are packets transmitted from the WAS 220 and the req B and the res A are packets transmitted from the web server 210. Because if packets are transmitted from a same server, source IPs of the packets are also identical. Accordingly, if the read threads distribute the packets based on the source IP, the packet handler threads cannot but process the packets with a same source IP sequentially and the correlation threads always receive the packets sequentially. At the time, since the packet handler threads receive the packets in temporal order all the time, it is impossible that the res A is assigned to the packet handler threads earlier than the req B or the req C is assigned to the packet handler threads earlier than the res B. As a result, since the correlation threads always receive request packets earlier before receiving response packets transmitted from the specific device, the phenomenon of trace loss can be solved.

Ingress port mirroring is to solve the problem of failing to guarantee that the packets are delivered to the packet handler threads and the correlation threads in order of packet generation because the read threads have a multi-thread structure if several switches are controlled. Explanation on the ingress port mirroring in the present invention will be given in comparison with egress port mirroring.

Figure 4A:
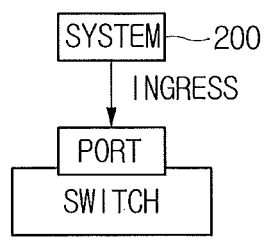
FIGS. 4A and 4B are diagrams explaining concepts of ingress port mirroring and egress port mirroring.
Figure 4B:
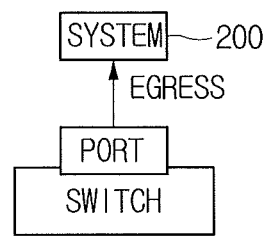

FIGS. 4A and 4B are diagrams explaining concepts of the ingress port mirroring and the egress port mirroring.

As illustrated in FIG. 4A, the ingress port mirroring method is a method of executing the mirroring at the time when the packet processing system 200 transmits a packet to a particular port. The mirroring is performed when the switch receives the packet.

Contrarily, as illustrated in FIG. 4B, the egress port mirroring method is a method of executing the mirroring at the time when the packet processing system 200 receives a packet from a particular port. The mirroring is performed when the switch sends the packet.

Figure 5:
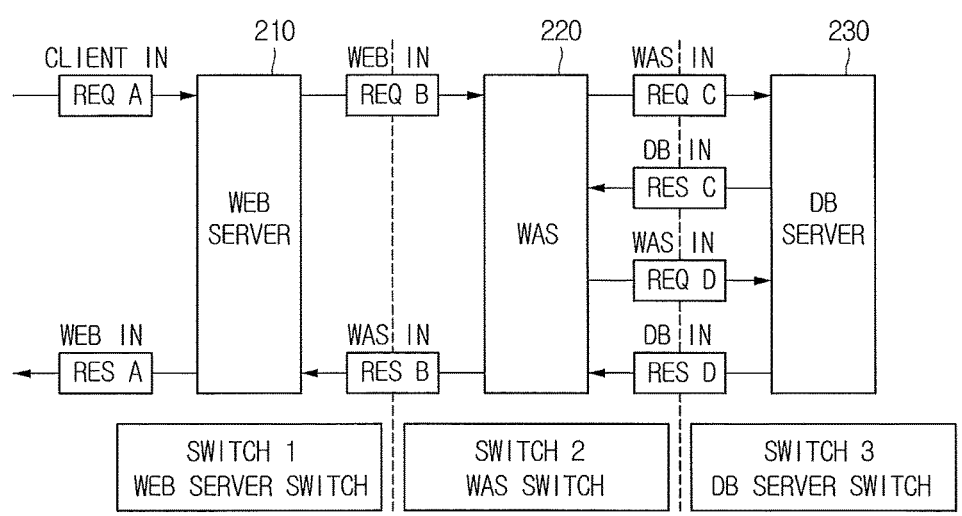
FIG. 5 is a diagram illustrating an ingress packet flow of the packet processing system in accordance with one example embodiment of the present invention.

FIG. 5 is a diagram illustrating an ingress packet flow of the packet processing system in accordance with one example embodiment of the present invention.

In FIG. 5, the web server 210 belongs to a switch 1 and the WAS 220 and the database server 230 belong to switches 2 and 3, respectively. In FIG. 5, the switch 1 receives the req A from the client device, sends the req B to the WAS 220, and copies the res A to the client device; and as a result the mirroring is performed. The packets are copied by the switch 1 and transmitted to the APM device 100; and the APM device 100 receives the packets and performs transaction matching through the read threads, the packet handler threads, and the correlation threads. The aforementioned operations occur even in the switches 2 and 3 where the WAS 220 and the database server 230 belong.

As the ingress operations allow one switch to execute the mirroring of requests and responses "transmitted" by a specific device, the packets "transmitted" by the specific device are read in a sequential order by a same read thread. In FIG. 5, the res B, the req C, a req D must be copied by the switch 2, in which case, it does not occur that the res B is copied earlier than the req C, and the req D. The aforementioned packet loss problem does not occur because the APM device 100 receives the packets in order of the req C, the req D and the res B (because it can always perceive that the req C and the req D should be received).

Figure 6:
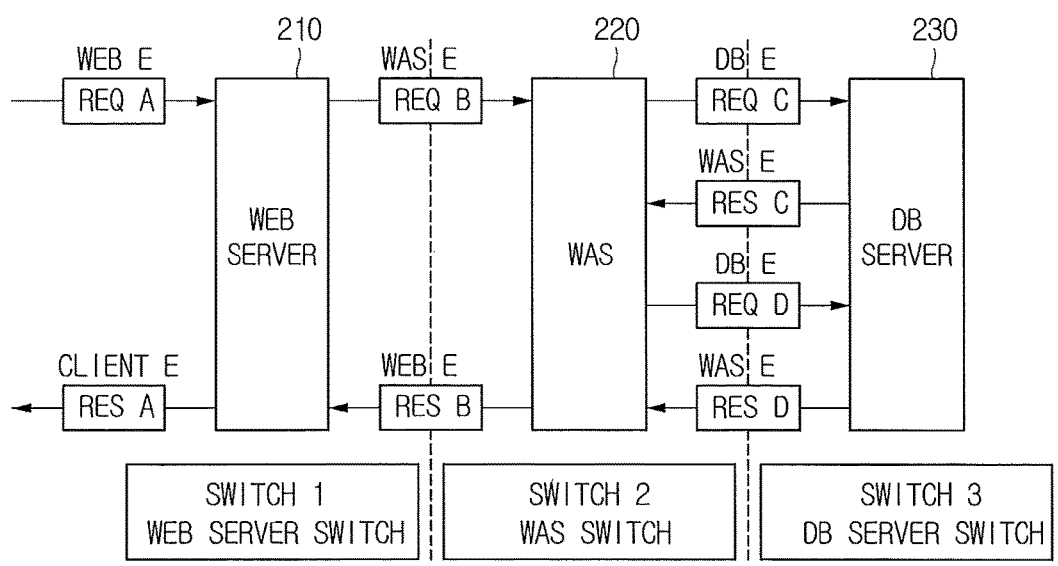
FIG. 6 is a diagram showing an egress packet flow of the packet processing system.

FIG. 6 is a diagram showing an egress packet flow of the packet processing system.

By referring to FIG. 6, if the egress mirroring occurs, the mirroring of requests and responses "received" by the specific device is executed in a switch. In the case, as the req D transmitted by the WAS 220 and the res D received by the WAS 220 are surely copied by another switch, the packets req D and res D are read by different read threads. Accordingly, if another request, response, etc. arrive earlier before the req D and the res D arrive to the correlation thread, information on some packets may be lost since the transactions are considered to be completely processed.

As such, the present invention may allow performance of transactions to be monitored without the omission of the traces by performing the ingress port mirroring and classifying the packets.

The aforementioned processor 120 performs a function of controlling data between the communication part 110 and other components. In short, the processor 120 controls the flow of data among respective components of the APM device 100 and controls the communication part 110 and other components to perform their unique functions.

The processor 120 may include a configuration of a micro processing unit (MPU), a central processing unit (CPU), cache memory, data bus, and other hardware. In addition, it may further include a configuration of an operating system, and software of an application that performs a special purpose.

The present invention has an effect of monitoring the performance of transactions effectively by tracking flow of the packets corresponding to the same transaction rapidly and accurately even under the situation of high network load.

The present invention has an effect of identifying the packets corresponding to the same transaction by classifying the packets acquired through the port mirroring based on at least either of a port number and an IP address of the client device.

The present invention has an effect of monitoring the performance of transactions without the omission of the traces by switches.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for monitoring transactions by analyzing packets in a packet processing system capable of processing packets transmitted from at least one client device, comprising steps of:
    (a) an application performance monitoring (APM) device classifying or supporting to classify at least one packet, if being acquired in the packet processing system through port mirroring, based on at least either of a port number and an IP address of the client device;
    (b) the APM device identifying and supporting to identify at least one pair of (i) at least one packet transmitted from at least one specific device among a plurality of devices, including the client device and at least one processing device in the packet processing system and (ii) at least one packet transmitted to the specific device in response to the at least one packet transmitted from the specific device by considering at least one packet under an identical classification; and
    (c) the APM device acquiring information on the transactions by using information on the identified pair of the packets;
    wherein the packet processing system includes: a web server for receiving and processing a request of the client device, a WAS for receiving and processing the request of the web server, and a database server for receiving and processing a query request of the WAS and returning a result of the query request,
    wherein the port mirroring is processed by switches connected respectively to the web server, the WAS, and the database server, and
    wherein the port mirroring is processed when the web server, the WAS, and the database server forward respective packets to particular ports of the switches, respectively.

2. The method of claim 1, wherein the step of (a) includes steps of:
    (a1) the APM device allowing at least one read thread to read at least one packet if the at least one packet is acquired through the port mirroring;
    (a2) the APM device allowing the at least one read thread to distribute the at least one packet based on a source IP to at least one packet handler thread;
    (a3) the APM device allowing the packet handler thread to distribute the at least one packet to at least one correlation thread based on the port number of the client device; and
    (a4) the APM device allowing the correlation thread to classify or cause to classify the packet based on ClientInfo as information that includes the port number and the IP address of the client device.

3. The method of claim 1, wherein, at the step of (b), the APM device identifies or supports to identify the pair of the packet transmitted from the specific device and the packet transmitted to the specific device in response to the packet transmitted from the specific device by using a source port as a port number of the specific device, a source IP as an IP address thereof, a destination IP as an IP address of the device that receives the packet transmitted therefrom, and a destination port as a port number of the device that receives the packet transmitted therefrom.

4. The method of claim 1, wherein, at the step of (a), ingress port mirroring is done.

5. A method for monitoring transactions by analyzing packets in a packet processing system capable of processing packets transmitted from at least one client device, comprising steps of:
(a) an application performance monitoring (APM) device classifying or supporting to classify at least one packet, if being acquired in the packet processing system through port mirroring, based on at least either of a port number and an IP address of the client device;
(b) the APM device identifying and supporting to identify at least one pair of (i) at least one packet transmitted from at least one specific device among a plurality of devices, including the client device and at least one processing device in the packet processing system and (ii) at least one packet transmitted to the specific device in response to the at least one packet transmitted from the specific device by considering at least one packet under an identical classification; and
(c) the APM device acquiring information on the transactions by using information on the identified pair of the packets;
wherein the packet processing system includes: a web server for receiving and processing a request of the client device, a WAS for receiving and processing the request of the web server, and a database server for receiving and processing a query request of the WAS and returning a result of the query request;
wherein the IP address and the port number of the client device are transmitted under the names of Remote IP and Remote Port if the transactions start between the web server and the WAS, and the IP address and the port number of the client device are transmitted by using a JDBC (Java Database Connectivity) driver BCI (Byte Code Instrumentation) or a JDBC driver wrapper if communications start between the WAS and the database server.

6. The method of claim 1, wherein the step of (a) includes steps of:
(a1) the APM device allowing at least one read thread to read at least one packet if the at least one packet is acquired through the port mirroring;
(a2) the APM device allowing the at least one read thread to distribute the at least one packet based on Source IP to at least one packet handler thread; and
(a3) the APM device allowing the packet handler thread to distribute the at least one packet to at least one correlation thread based on at least either of the port number and the IP address of the client device.

7. An APM device for monitoring transactions by analyzing packets in a packet processing system capable of processing packets transmitted from at least one client device, comprising:
a communication part for acquiring or supporting to acquire at least one packet from the packet processing system through port mirroring; and
a processor for (i) classifying or supporting to classify the acquired at least one packet based on at least either of a port number and an IP address of the client device, (ii) identifying and supporting to identify at least one pair of (ii-1) at least one packet transmitted from at least one specific device among a plurality of devices, including the client device and at least one processing device in the packet processing system and (ii-2) at least one packet transmitted to the specific device in response to the at least one packet transmitted from the specific device by considering at least one packet under an identical classification, and (iii) acquiring information on the transactions by using information on the identified pair of the packets;
wherein the packet processing system includes: a web server for receiving and processing a request of the client device, a WAS for receiving and processing the request of the web server, and a database server for receiving and processing a query request of the WAS and returning a result of the query request;
wherein the port mirroring is processed by switches connected respectively to the web server, the WAS, and the database server;
wherein the port mirroring is processed when the web server, the WAS, and the database server forward respective packets to particular ports of the switches, respectively.

8. The device of claim 7, wherein the processor:
(i) allows at least one read thread to read at least one packet if the at least one packet is acquired through the port mirroring; (ii) allows the at least one read thread to distribute the at least one packet based on a source IP to at least one packet handler thread; (iii) allows the packet handler thread to distribute the at least one packet to at least one correlation thread based on the port number of the client device; and (iv) allows the correlation thread to classify or cause to classify the packet based on ClientInfo as information that includes the port number and the IP address of the client device.

9. The device of claim 7, wherein the processor identifies or supports to identify the pair of the packet transmitted from the specific device and the packet transmitted to the specific device in response to the packet transmitted from the specific device by using a source port as a port number of the specific device, a source IP as an IP address thereof, a destination IP as an IP address of the device that receives the packet transmitted therefrom, and a destination port as a port number of the device that receives the packet transmitted therefrom.

10. The device of claim 7, wherein ingress port mirroring is done.

11. An APM device for monitoring transactions by analyzing packets in a packet processing system capable of processing packets transmitted from at least one client device, comprising:
a communication part for acquiring or supporting to acquire at least one packet from the packet processing system through port mirroring; and
a processor for (i) classifying or supporting to classify the acquired at least one packet based on at least either of a port number and an IP address of the client device, (ii) identifying and supporting to identify at least one pair of (ii-1) at least one packet transmitted from at least one specific device among a plurality of devices, including the client device and at least one processing device in the packet processing system and (ii-2) at least one packet transmitted to the specific device in response to the at least one packet transmitted from the specific device by considering at least one packet under an identical classification, and (iii) acquiring information on the transactions by using information on the identified pair of the packets;

wherein the packet processing system includes: a web server for receiving and processing a request of the client device, a WAS for receiving and processing the request of the web server, and a database server for receiving and processing a query request of the WAS and returning a result of the query request;

wherein the IP address and the port number of the client device are transmitted under the names of Remote IP and Remote Port if the transactions start between the web server and the WAS, and the IP address and the port number of the client device are transmitted by using a JDBC (Java Database Connectivity) driver BCI (Byte Code Instrumentation) or a JDBC driver wrapper if communications start between the WAS and the database server.

12. The device of claim 7, wherein the processor:
(i) allows at least one read thread to read at least one packet if the at least one packet is acquired through the port mirroring; (ii) allows the at least one read thread to distribute the at least one packet based on Source IP to at least one packet handler thread; and (iii) allows the packet handler thread to distribute the at least one packet to at least one correlation thread based on at least either of the port number and the IP address of the client device.

* * * * *